United States Patent [19]

Rawlyk et al.

[11] Patent Number: 5,274,726
[45] Date of Patent: Dec. 28, 1993

[54] OPTICAL FIBER UNITS AND OPTICAL CABLES

[75] Inventors: Michael G. Rawlyk; David W. Chiasson, both of Saskatoon, Canada

[73] Assignee: Northern Telecom Limited, Montreal, Canada

[21] Appl. No.: 949,929

[22] Filed: Sep. 24, 1992

[51] Int. Cl.⁵ .............................................. G02B 6/44
[52] U.S. Cl. .................................................... 385/109
[58] Field of Search .............. 385/100, 101, 102, 109, 385/114, 112, 147

[56] References Cited

U.S. PATENT DOCUMENTS

| | | | |
|---|---|---|---|
| 4,090,902 | 5/1978 | Ferretino et al. | 355/114 |
| 4,138,193 | 2/1979 | Olszewski et al. | 385/114 |
| 4,151,031 | 4/1979 | Goad et al. | 156/324 |
| 4,521,767 | 6/1985 | Bridge | 385/102 |
| 4,784,461 | 11/1988 | Abe et al. | 385/112 |
| 4,909,591 | 3/1990 | Capol | 385/100 |

FOREIGN PATENT DOCUMENTS 0100609 4/1991 Japan ................................... 385/100

Primary Examiner—Akm E. Ullah
Attorney, Agent, or Firm—R. J. Austin

[57] ABSTRACT

Optical fiber units having an optical fiber housed within a flexible tube which in a normal axially unstressed condition is sinusoidal and approaches the fiber first on one side and then on the other. With this structure, upon tube shrinkage occurring, the amplitude increases so as to bend the fiber laterally at desired positions along the fiber length.

2 Claims, 2 Drawing Sheets

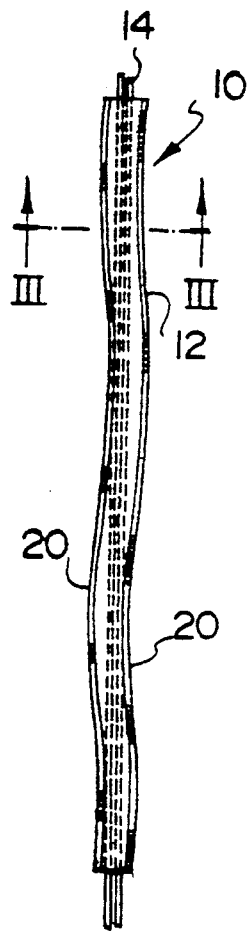
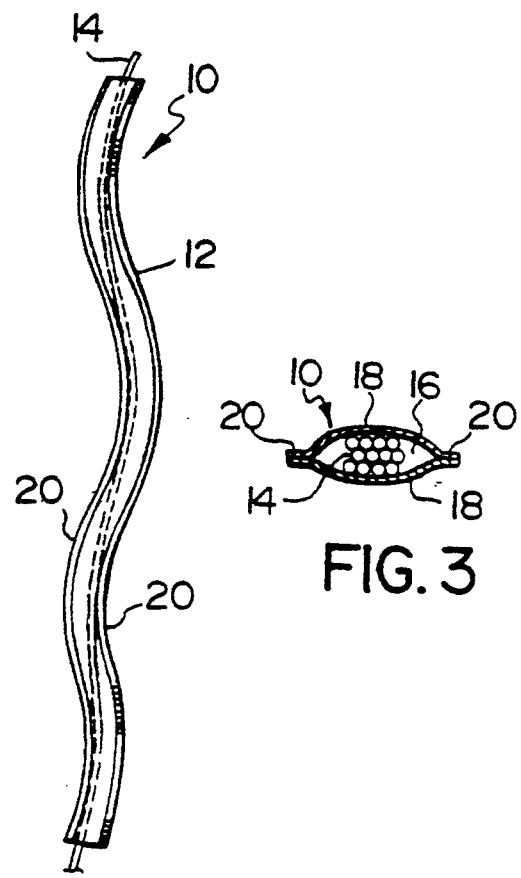
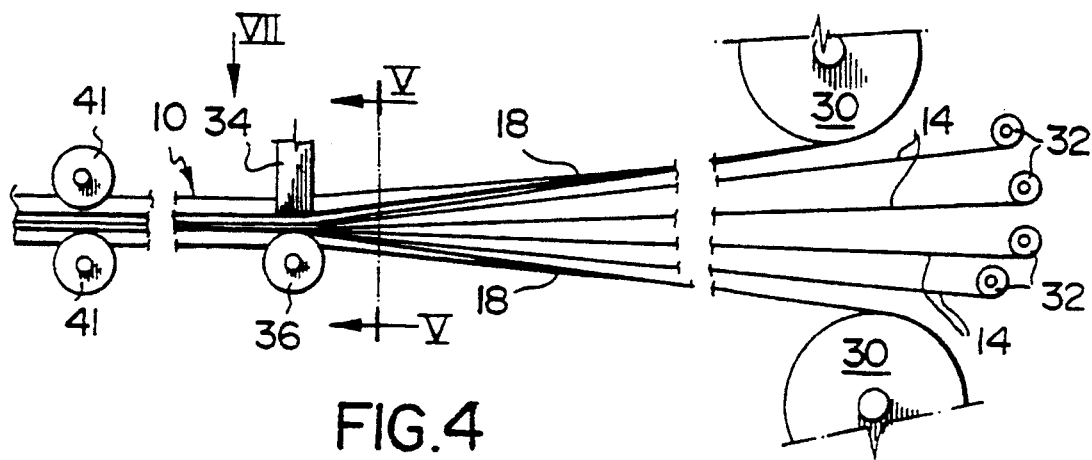
FIG.1  FIG.2  FIG.3
FIG.4

OPTICAL FIBER UNITS AND OPTICAL CABLES

This invention relates to optical fiber units and optical cables.

In optical cable structures, optical fibers are contained within passages formed within tubes or formed between cable components. So as to prevent stretching of the fibers under tensile loads applied to cable, the fiber lengths are greater than the lengths of passages in which they lie over a unit length of cable so that the fibers wander laterally of the passages to accommodate the excess lengths. This structure is provided so that when the cable is tensioned and stretched, the fibers tend merely to move untensioned towards straight conditions. Problems arise, however, when a fiber length greatly exceeds the passage length. This may occur for instance when the fibers are in a tube which shrinks due, e.g. to thermal contraction or thermal aging. As shrinkage continues, the fiber will bend increasingly and it may contact the tube wall. The part in contact with the wall will straighten as bending continues and a situation may arise where substantial lengths of fiber will eventually frictionally engage opposite sides of the passage and this will affect the fiber's ability to buckle. As a result, during longitudinal collapse of fiber which must be accompanied by buckling, the fiber may not buckle along extended lengths which engage the passage sides, but instead may only tend to buckle along fiber lengths extending laterally from side-to-side of the passage. However, instead of these laterally extending lengths buckling from end to end, it is possible that bending may occur mainly in localized fiber regions where the fiber changes direction from its contact with the passage wall to its movement laterally. When this happens, bending or buckling will take place at these localized regions. Fiber will easily bend at these regions and under these conditions to low and undesirable bend radii which may result in high signal attenuation.

In an alternative situation, the passage width may be large and should the fiber length in the passage be excessive relative to the passage length, the fiber as it meanders across the passage may lie at a sufficiently high angle to the axis of the passage that buckling below a desired minimum desired bend radius may occur at the peaks of the meanders.

The present invention seeks to provide an optical fiber unit and method of making such an assembly which, in use, will minimize or overcome the above problems.

Accordingly, the present invention provides an optical fiber unit comprising a flexible tube and at least one optical fiber located within and extending along a passage within the tube, the passage having a configuration such that in a normal axially unstressed condition of the tube, the passage extends sinusoidally along the tube so that opposite sides of the passage extend towards and then move away from the fiber alternately from side to side of the passage along the length of the tube.

The tube may be formed in any practical manner that may enable it to have a sinusoidally extending passage along it.

In use, with the tube laid into and forming part of an optical cable, when the tube is subjected to any shrinkage then such shrinkage will be accompanied by an increase in the amplitude of the sinuations. This increase in amplitude and as the tube continues to shrink it engages the fiber alternately on one side and then on the other to apply pressure against the optical fiber so as to move the optical fiber laterally of its length whereby the fiber is caused to bend in a sinuous fashion. This bending which takes place only at predetermined positions dictated by the pitch of the sinuations of the tube controls the bending of the fiber at the predetermined positions so that the fiber bend radius is decreased also in a controlled fashion. The assembly may therefore be designed with respect to the diameter of the fiber and the dimensions across the passage to ensure that the fiber will be bent controllably and with the predetermined positions at desired distances apart conducive with the minimum bend radius of the fiber being above the recommended minimum below which undesirable signal attenuation would take place. With this arrangement, the sinuous nature of the passage does not permit the optical fiber to engage a sufficiently long length of the passage surface to result in frictional resistance to fiber movement and resultant undesirable kinking of the fiber in localized regions.

Conveniently, the tube of the optical fiber unit is formed of two flexible plastics strips which are opposed to one another on each side of the passage. The strips are bonded together along two longitudinally extending seams spaced laterally of one another across the passage and the two seams extend sinusoidally along the tube so as to define the sinusoidal passage.

The invention also includes an optical cable comprising a jacket surrounding a core comprising an optical fiber unit having a flexible tube and at least one optical fiber located within and extending along a passage within the tube, the passage having a configuration such that in a normal axially unstressed condition of the tube, the passage extends sinusoidally along the tube so that opposite sides of the passage extend towards and then away from the fiber alternately from side-to-side of the passage along the length of the tube.

The invention further includes a method of making an optical fiber unit comprising: passing two flexible plastic strips to a position of convergence in which a major surface of one strip opposes a major surface of the other strip and simultaneously passing at least one fiber to the position of convergence to locate the fiber between the two strips; and bonding the two strips together along two longitudinally extending seams spaced laterally of one another across the strips to form a tube, and controlling the bonding to cause the two seams to extend sinusoidally along the tube so as to form a sinusoidally extending passage within the tube, the passage containing the optical fiber and with opposite sides of the passage extending towards and then away from the fiber alternately from side-to-side of the passage along the length of the tube.

One embodiment of the invention will now be described, by way of example, with reference to the accompanying drawings, in which:

FIG. 1 is a side elevational view of an optical fiber unit according to the embodiment;

FIG. 2 is a view similar to FIG. 1 of a unit subjected to shrinkage;

FIG. 3 is a cross-sectional view taken the along line III—III in FIG. 1;

FIG. 4 is a partly diagrammatic side elevational view of an apparatus for making the assembly of the embodiment and to a larger scale;

Figure 5:
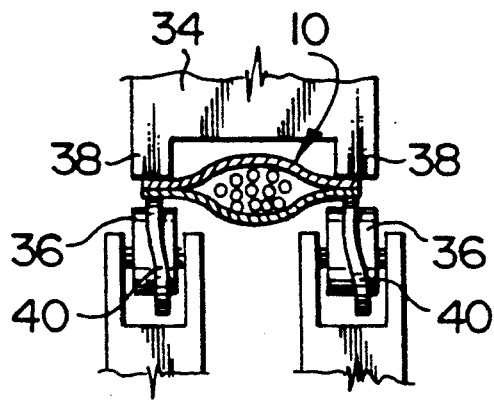
FIG. 5 is a view of part of the apparatus in the direction of arrow V in FIG. 4 to show the optical fiber unit at one stage of manufacture.

In the embodiment as shown by FIGS. 1 and 2 an optical fiber unit 10 comprises a flexible tube 12 and a plurality of optical fibers 14 disposed within a passage 16 within the tube.

The tube is formed from two plastic strips 18 (e.g. polyolefin), the strips having major surfaces opposing one another on each side of the passage as shown in FIG. 3. The strips are bonded together along two longitudinally extending seams 20 spaced laterally of one another across the passage and provided by overlapping edge regions of the two strips.

The tube 12 extends in sinuous fashion along its length in the elevational view of FIG. 1, with the seams also being sinuous to provide sinuosity to the passage 16. In the view of the plane of FIG. 1, the tube is substantially rectilinear. As a result of this structure, the optical fibers 14 within the tube are approached alternately first by one side of the passage and then by the other side along the length of the tube. The tube has a major axis with an inside dimension between the bond regions of approximately 3 mm and a minor axis normal to the major axis, the inside dimension along the minor axis being approximately 1.1 mm.

The dimensions of the passage 16, the length of each sinuation and its amplitude, and the dimensions of the fibers are such that when the assembly is in its normal unstressed condition, the inside of the passageway approaches extremely close to the fibers first on one side and then on the other as shown in FIG. 1. The inside of the passage should be sufficiently close at these alternating positions that upon shrinkage of the tube for any reason in use within a cable, the accompanying increase in amplitude of the sinuations will result in the tube bending the fibers sideways at predetermined positions dictated by the change in direction of the sinuations so that the fibers are caused to bend only at those positions as shrinkage takes place. Thus, the predetermined positions at which fiber bending takes place are spaced predetermined distances apart. Also it may be approximately predetermined by the material and the design of the tube what will be the resultant bending radii of the fibers for any particular tube shrinkage. As a result, the fibers under normally expected shrinkage of the tube may be maintained with a minimum bend radius satisfactorily above that which could result in an undesirable amount of signal attenuation. In the embodiment, the thickness of each strip 18 is approximately 2 mm, and the amplitudes of the tube passage sinuations are approximately 0.5 mm with a pitch of 37 mm.

FIG. 2 gives an illustration of the type of action which takes place during shrinkage of the tube 12. As may be seen from FIG. 2 during shrinkage, the amplitudes of the sinuations increase with resultant decrease in pitch and the sides of the passage alternately apply lateral loads at the peak regions of the sinuations against the fibers which are hence caused to bend at these positions. It is worthy of note that because the tube is not straight, it is not possible for the fibers to lie in contact with the tube for substantial distances along its length but should only contact the tube at the changeover positions or peaks of the sinuations, whereby no substantial frictional contact is permitted between fibers and tube wall so that localized kinking of fibers during tube shrinkage cannot occur. Bending of the fibers is therefore controlled and may only take place at positions dictated by the sinuations.

Conveniently, the assembly 10 may be made in apparatus as shown in FIGS. 4 to 7.

As shown in FIG. 4, the two plastic strips 18 are fed from reels 30 so as to converge with major faces opposing one another at a convergence position at which they pass through a welding apparatus. The optical fibers to be placed within the tube are individually fed from further spools 32 to be disposed between the major surfaces of the strips at the welding apparatus.

Figure 6:
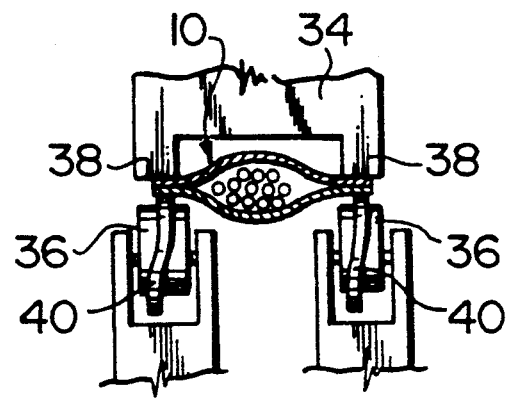
FIG. 6 is a view similar to FIG. 5 at a different stage of manufacture.
Figure 7:
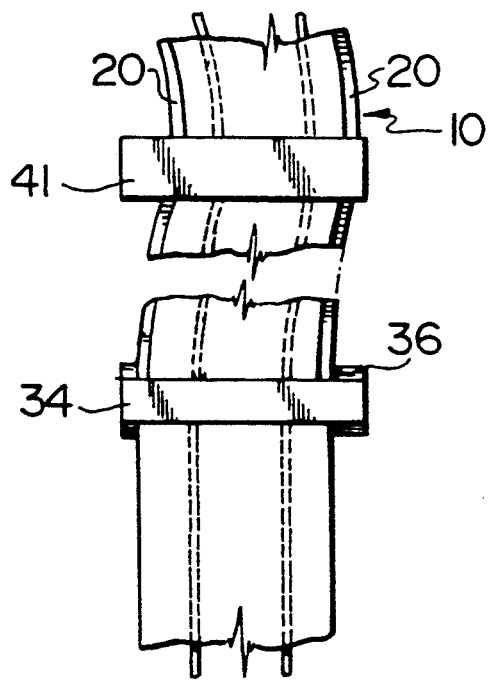
FIG. 7 is a plan view of part of the apparatus during manufacture and taken in the direction of arrow VII in FIG. 4.

The welding apparatus comprises a welding head or bolster 34 and two lower rolls 36 which are coaxial and are spaced apart laterally of the passline for the two strips 18. The rolls confront downwardly depending side projections 38 of the bolster 34. Each roll 36 has upon its peripheral surface a continuous raised projection 40 which extends around the roll in waveform so that it moves from one end of the roll to the other around 180° of the circumference. This is shown in FIGS. 5 and 6. To make the tube 12, the strips are fed through the welding apparatus with the opposed edge regions of the strips disposed between the downward projections 38 of the bolster and the raised projections 40 of the rolls 36. The strips are held apart between their edge regions by the fibers which lie between them and the upper strip occupies a space underneath the bolster and defined between the projections 38. During passage of the strips through the welding apparatus, the rolls 36 are rotated and an electric current is passed through the rolls and into the bolster, pressure being applied between the projections 40 and the projections 38 upon the opposed edge regions of the strips so that the electrical current heats the edge regions to bond them together to form the seams 20. As the rolls 36 rotate, the projections 40 reciprocate, in phase laterally of the passline of the strips so that the projections 40 in one angular position of the roll are as shown in FIG. 5 and in another angular position around 180° of roll movement, the projections are shown as in FIG. 6.

Lateral reciprocating movement of the projections 40 is accompanied by lateral movement of the strips 18 as they pass over the rolls, this strip movement being caused by the lateral pressure applied upon the strips by the projections 40 first laterally in one direction and then in the other. The strips cannot slip relative to one another because immediately downstream of the welding apparatus they are welded together and must therefore move laterally at this point as one article. Slightly downstream of the welding apparatus, the formed tube is passed between rolls 41 which do not allow for lateral tube slippage. Thus, as a result of this lateral reciprocating movement of the projections 40, the strips on the downstream side from the welding apparatus form the tube into the sinuous construction which is shown in FIG. 1.

Welding may be performed by another process, e.g., ultrasonics which may use rolls 36 to contact the strip 18 in the manner described above.

Figure 8:
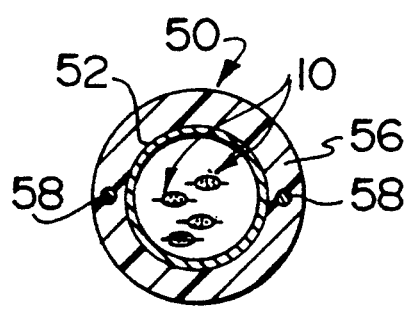
FIG. 8 is a cross-sectional view through an optical cable incorporating a plurality of tube and optical fiber assemblies according to the embodiment.

A plurality of the tubes 10 may be incorporated as part of an optical cable. For instance, as shown by FIG. 8, an optical cable 50 comprises a core formed by a plurality of the tubes 10 extending longitudinally along a passageway within a corrugated steel sheath 52.

Within the passageway of the sheath 52 a water blocking material may be incorporated around the tubes 10, this water blocking material either comprising a swellable particulate material or a swellable filament extending longitudinally of the passageway or alternatively a conventional gel or grease material. Surrounding the steel sheath is a jacket 56 incorporating longitudinally extending tensile strength members 58 which are diametrically opposed to one another in the jacket.

What is claimed is:

1. A method of making an optical fiber unit comprising:

passing two flexible plastic strips to a position of convergence in which a major surface of one strip opposes a major surface of the other strip and simultaneously passing at least one fiber to the position of convergence to locate the fiber between the two strips;

and bonding the two strips together along two longitudinally extending seams spaced laterally of one another across the strips to form a tube and controlling the bonding to cause the two seams to extend sinusoidally along the tube so as form a sinusoidally extending passage within the tube, the passage containing the optical fiber and with opposite sides of the passage extending towards and then away from the fiber alternately from side-to-side of the passage along the length of the tube.

2. A method according to claim 1 wherein each of the seams is formed by moving a welding tool surface reciprocally laterally of a passline for the two converged strips and in contact with overlapped edge regions of the two strips.

* * * * *